United States Patent [19]

Collomb et al.

[11] Patent Number: 4,579,833

[45] Date of Patent: Apr. 1, 1986

[54] PROCESS FOR THE PREPARATION OF A SUPPORTED CATALYST BASED ON VANADIUM COMPOUNDS FOR THE POLYMERIZATION AND COPOLYMERIZATION OF ETHYLENE AND THE CATALYSTS OBTAINED THEREBY

[75] Inventors: Joelle Collomb, Marseilles; Laszlo Havas, Martigues, both of France

[73] Assignee: BP Chemicals Limited, London, England

[21] Appl. No.: 700,191

[22] Filed: Feb. 11, 1985

[30] Foreign Application Priority Data

Feb. 23, 1984 [FR] France .................. 84 02723

[51] Int. Cl.$^4$ ............................................. C08F 4/68
[52] U.S. Cl. ................................. 502/104; 502/115; 502/121; 502/122; 502/123; 502/124; 502/126; 502/132; 502/134; 526/125
[58] Field of Search ............... 502/104, 121, 122, 123, 502/124, 126, 115, 132, 134

[56] References Cited

U.S. PATENT DOCUMENTS

| | | | |
|---|---|---|---|
| 3,412,174 | 11/1968 | Kroll | 502/117 X |
| 4,487,846 | 12/1984 | Bailly et al. | 502/134 X |
| 4,490,475 | 12/1984 | Bailly et al. | 502/134 X |
| 4,497,904 | 2/1985 | Blaya et al. | 502/134 X |
| 4,511,703 | 4/1985 | Bailly | 502/126 X |

FOREIGN PATENT DOCUMENTS 99773 2/1984 European Pat. Off. .

Primary Examiner—Patrick P. Garvin
Attorney, Agent, or Firm—Brooks, Haidt, Haffner & Delahunty

[57] ABSTRACT

New catalysts which can be used for the polymerization and copolymerization of ethylene, comprising a support consisting basically of magnesium chloride on which is deposited by precipitation a vanadium compound, obtained by bringing a vanadium compound in which the vanadium is at one of the two maximum valencies 4 and 5 in contact with a support consisting basically of magnesium chloride and optionally of aluminium chloride and comprising products with an Mg—C bond.

17 Claims, No Drawings

PROCESS FOR THE PREPARATION OF A SUPPORTED CATALYST BASED ON VANADIUM COMPOUNDS FOR THE POLYMERIZATION AND COPOLYMERIZATION OF ETHYLENE AND THE CATALYSTS OBTAINED THEREBY

The present invention relates to new catalysts and to a new process for the preparation of these catalysts and also the processes of using these catalysts for the production of ethylene polymers and copolymers of ethylene and alpha-olefins.

It is known that "Ziegler-Natta" catalytic systems for the polymerisation of ethylene and copolymerisation of ethylene and alpha-olefins, consist on the one hand of catalysts comprising compounds of transition metals belonging to Groups IV, V and VI of the Periodic Table of Elements, and on the other hand of co-catalysts comprising organo-metallic compounds of metals belonging to Groups I to III of the said Table.

It is also known that the properties of these catalysts may be greatly improved when the transition metal compound of the catalyst is associated with a solid mineral compound which may be co-precipitated with the said transition metal compound, or which may be used as a support for the said transition metal compound. Solid mineral compounds which may be advantageously used as support are magnesium and titanium oxides, aluminium silicate, magnesium carbonate, magnesium alcoholates and magnesium chloride.

In this technique of supported catalysts, problems related to the support on the one hand and the process of the preparation of the catalyst, for example by depositing the transition metal compound on the support, on the other hand, have a very great importance in regard to the properties of the catalyst obtained.

In particular it is known that catalysts can be prepared comprising a support consisting basically of magnesium chloride and optionally aluminium chloride and which may occur in the form of spheroidal particles with a narrow particle size distribution, on which supports there is precipitated a compound of a transition metal belonging to Groups IV, V and VI of the Periodic Table of Elements. This precipitation in fact is performed by a reduction reaction, in the presence of the support, of a compound of a transition metal at its maximum valency by means of one or more reducing agents, such as organo-metallic compounds chosen from among organo-magnesium, organo-zinc or organo-aluminium compounds. This reduction reaction may also be performed in the presence of an electron donor compound. However, in practice, precipitation in the presence of the support of a transition metal compound, especially a vanadium compound, by means of one or more reducing agents, is produced partially outside the support, and consequently forming a certain amount of very fine particles leading to catalysts with a broad particle size distribution. Such catalysts lead to polymer powders which are difficult to handle and which when being handled offer considerable risks of explosion.

It is also known that catalysts can be prepared using the same magnesium chloride and optional aluminium chloride supports, on which supports there is carried out first of all a treatment by means of an electron donor compound chosen from among the aromatic ethers or esters of an aromatic acid, then an impregnation by means of titanium tetrachloride. The catalysts prepared in this way comprise a titanium compound in a non-reduced form, that is to say in a form in which the titanium is present at its maximum valency. These catalysts may generally not contain more than about 3% of titanium atoms per atom of magnesium of the support. The result is that the polymers obtained have relatively large contents of inorganic residues originating from the supports of the said catalysts, such as magnesium chloride and possibly aluminium chloride.

Furthermore, it is known that polyolefins and in particular polyethylenes obtained in the presence of catalysts such as those described above, especially those comprising a titanium compound as the transition metal compound, usually have a molecular weight distribution which is too narrow for them to be converted easily into finished objects such as hollow bodies and films, by the current techniques of blow-moulding.

The present invention is concerned with novel supported catalysts which makes possible, in particular, the production of polymers or copolymers of ethylene with a broad molecular weight distribution intended for blow-moulding applications.

The invention is also concerned with a process for preparing these catalysts which process makes it possible to avoid the drawback of the prior art such as the production of very fine particles during precipitation of the transition metal compound on to the support or the impossibility of depositing by impregnation sufficient quantities of transition metal compound on the support.

The catalysts of the present invention comprise a support consisting basically of magnesium chloride and optionally containing aluminium chloride, on which a vanadium compound is deposited by precipitation. These catalysts are advantageously prepared by a process wherein a vanadium compound in which the vanadium is at one of the two maximum valencies 4 or 5, is brought into contact with a support consisting basically of magnesium chloride and optionally aluminium chloride and comprising products with an Mg—C bond in a quantity such that the ratio of the number of Mg—C bonds to the total number of magnesium atoms contained in the support is comprised between 0.001 and 0.05, and preferably comprised between 0.005 and 0.03, the quantities of vanadium compound and support brought into contact with each other being such that the molar ratio of the quantity of vanadium compound to that of the magnesium chloride of the support is greater than 0.05 and is preferably comprised between 0.05 and 5, and most preferably comprised between 0.08 and 2.

The support of the catalyst consisting basically of magnesium chloride and optionally of aluminium chloride, may occur preferably in the form of powders consisting of particles having the following characteristics:

the particles have a spheroidal form defined by the fact that if D and d are the large and small axes of these particles, D:d is less than or equal to 1.3;

the particles have a mean diameter by mass adjustable at will and comprised between about 10 and 100 microns;

the particle size distribution of these particles is such that the ratio Dm:Dn of the mean diameter by mass, Dm, to the mean diameter by number, Dn, is less than or equal to 3, for example comprised between 1.1 and 2.5; more especially the particle size distribution of these particles may be very narrow and such that the ratio Dm:Dn is comprised between 1.1 and 1.5, particularly when the catalyst prepared from this support is used in a polymerisation process in the gas phase by means of a fluidised bed; furthermore the support comprises practically no particles with a diameter greater than $2 \times Dm$ or less than $0.2 \times Dm$;

the particles may have a slightly dented surface such as that of a raspberry, but preferably a very smooth surface;

the specific surface area of the particles is comprised between about 20 and 60 m²/g (BET);

the density of the particles is comprised between about 1.2 and 2.2.

The supports thus defined may in particular be prepared by reacting an organo-magnesium compound with a chlorinated organic compound in the presence of an electron donor compound. As organo-magnesium compound one may choose either a product of the formula $R_1MgR_2$, or an addition complex of the formula $R_1MgR_2, xAl(R_3)_3$, in which formula $R_1$, $R_2$ and $R_3$ are identical or different alkyl radicals having from 2 to 12 carbon atoms and x is comprised between 0.001 and 10, preferably comprised between 0.01 and 2. As chlorinated organic compound one chooses an alkyl chloride of the formula $R_4Cl$ in which $R_4$ is a secondary or preferably tertiary alkyl radical having from 3 to 12 carbon atoms. The electron donor compound used is an organic compound comprising at least one atom of oxygen, sulphur, nitrogen or phosphorus. It may be chosen from among a large variety of products such as the amines, amides, phosphines, sulphoxides, sulphones or ethers. Amongst the electron donor compounds, one may choose in particular an aliphatic ether oxide of the formula $R_5OR_6$, in which $R_5$ and $R_6$ are identical or different alkyl radicals having from 1 to 12 carbon atoms.

Furthermore, the various reactants involved for the preparation of the supports as defined above must be used under the following conditions:

the molar ratio $R_4Cl/R_1MgR_2$ is comprised between 1.8 and 2, and preferably comprised between 1.85 and 1.99;

the molar ratio $R_4Cl/R_1MgR_2, xAl(R_3)_3$ is comprised between 1.8 (1+3x/2) and 2 (1+3x/2), and preferably between 1.85 (1+3x/2), and 1.99 (1+3x/2);

the molar ratio between the electron donor compound and the organo-magnesium compound ($R_1MgR_2$ or $R_1MgR_2, xAl(R_3)_3$ is comprised between 0.01 and 2, and preferably comprised between 0.01 and 1;

the reaction between the organo-magnesium compound and the chlorinated organic compound takes place with stirring a liquid hydrocarbon medium at a temperature comprised between 5° C. and 80° C., and in particular between 35° C. and 80° C.

The preparation of the catalysts according to the invention is performed by bringing the supports thus defined into contact with a vanadium compound in which the vanadium has one of its two maximum valencies 4 or 5, this vanadium compound under normal conditions being generally liquid and/or soluble in liquid hydrocarbons. As vanadium compound in which the vanadium is at one of its two maximum valencies 4 or 5, one may use a compound of the general formulae $$V(OR_7)_{4-m}X_m \text{ or } VO(OR_7)_{3-n}X_n$$

in which $R_7$ represents an alkyl group containing 2 to 6 carbon atoms, X is a chlorine or bromine atom, m is an integer or a fraction comprised between 1 and 4 and n is an integer or a fraction comprised between 1 and 3. Amongst these vanadium compounds it is preferred to use vanadium tetrachloride and vanadium oxytrichloride.

During the contacting of the support and the vanadium compound in which the vanadium is at one of its two maximum valencies 4 or 5, there is produced on the said support a precipitation of vanadium compound. This precipitation corresponds to a reduction reaction of the vanadium compound employed, which reduction reaction is largely spontaneous. In fact the number of Mg—C bonds involved with the support in the preparation of the catalyst in less than the number of molecules of reduced vanadium compound.

The contacting of the support with the vanadium compound in which the vanadium is at one of its two maximum valencies 4 or 5 may be performed in the presence of an electron donor compound (ED) chosen from amongst the organic compounds comprising at least one atom of oxygen, sulphur, nitrogen or phosphorus, such as for example the ethers, amines, amides, phosphines, sulphoxides or sulphones, in a quantity such that the molar ratio of the electron donor compound to the vanadium compound is comprised between 0.005 and 1, preferably between 0.01 and 0.5, most preferably between 0.01 and 0.2. The electron donor compound may be contained in part or in whole in the support before the latter is brought into contact with the vanadium compound, which may simplify the process of preparation of the catalysts.

The contacting of the support with the vanadium compound in which the vanadium is at one of its two maximum valencies may be carried out according to any known method of impregnation. It may be performed dry, but preferably in a liquid hydrocarbon medium such as n-hexane or n-heptane. This contacting may be carried out for a period preferably of at least 1 hour with stirring, at a temperature comprised between $-20°$ C. and 150° C. and preferably comprised between 0° C. and 100° C.

The reactants may be employed in various ways. For example one may introduce gradually into the liquid hydrocarbon medium containing the vanadium compound the support powder previously brought into suspension the liquid hydrocarbon. It is also possible to introduce gradually and simultaneously into the liquid hydrocarbon medium the support powder previously suspended in the liquid hydrocarbon and the vanadium compound. However, it is generally simpler to introduce the vanadium compound gradually into the liquid hydrocarbon medium containing the support powder in suspension. The catalyst thus obtained may then be washed several times with a liquid hydrocarbon such as n-hexane or n-heptane, at a temperature comprised between about 0° C. and 100° C.

The novel catalysts prepared according to the present invention consist basically of magnesium chloride and optionally of aluminium chloride, as well as a vanadium compound in a reduced form corresponding to a valency condition which is less than one of the two maximum valencies 4 or 5, in a quantity such that the atomic ratio of the quantity of vanadium to that of the magnesium is at least equal to 0.05 and preferably is less than 1. They may optionally contain an electron donor compound (ED) of the type defined above, in a quantity such that the molar ratio of the electron donor to the magnesium chloride is below 0.1, preferably between 0.0002 and 0.5, most preferably between 0.0003 and 0.03.

In the case where the support comprises magnesium chloride and products containing a Mg—C bond, the new catalysts of the present invention can have the general formula:

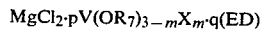

or

wherein $R_7$ represents an alkyl group containing 2 to 6 carbon atoms, X is chlorine or bromine, ED is an electron donor compound of the type defined above, m is an integer or a fraction from 1 to 3 inclusive, n is an integer or a fraction from 1 to 2 inclusive, p is at least 0.05 and is preferably less than 1 and q is from zero to 0.1, preferably from 0.0002 to 0.03.

The novel catalysts prepared according to the present invention occur in the form of solid particles, the physical properties of which, such as the shape, surface appearance, mean diameter by mass and particle size distribution, are more or less identical to those of the support particles from which they originated. In particular these catalyst particles may have a spheroidal shape, defined by the fact that if D and d are the large and small axes respectively of these particles, D:d is less than or equal to 1.3. They may have a mean diameter by mass comprised between 10 and 100 microns and a particle size distribution such that the ratio of the mean diameter by mass Dm to the mean diameter by number Dn of these particles is less than or equal to 3, and preferably from 1.1 to 2.5.

The catalysts according to the invention may be used for the polymerisation of ethylene or copolymerisation of ethylene with one or more alpha-olefins comprising 3 to 8 carbon atoms by using the known techniques of suspension polymerisation in a liquid hydrocarbon medium or in the gas phase, for example, in a fluidised bed. In all cases polymerisation or copolymerisation is carried out using as co-catalysts an organo-metallic compound of a metal belonging to Groups I to III of the Periodic Table of Elements, preferably an organo-aluminium compound. The constituents of the catalyst system, catalyst or co-catalyst, must be used in proportions such that the atomic ratio of the quantity of the metal in the co-catalyst to the quantity of vanadium in the catalyst is comprised between 0.5 and 50. Polymerisation or copolymerisation may be performed at a temperature comprised between about 50° C. and 110° C., preferably comprised between 70° C. and 100° C. under a total pressure of less than 4 MPa.

The catalysts prepared according to the invention may be used as they are or after being subjected to a prepolymerisation operation. This prepolymerisation operation which leads to particles whose dimensions and shapes are more or less homothetic with those of the initial catalyst, consists in bringing the catalyst and co-catalyst into contact with ethylene, possibly in admixture with one or more alpha-olefins comprising 3 to 8 carbon atoms.

The prepolymerisation may be carried out in one or two stages. The commencement of the prepolymerisation reaction or the first stage of this reaction when one operates in two separate stages, are perforce carried out in suspension in a liquid hydrocarbon medium.

The first prepolymerisation stage may be continued until 10 g of polyethylene or copolymer of ethylene are obtained per milligramme atom of vanadium. Prepolymerisation may then be continued either in suspension in a liquid hydrocarbon medium or in the gas phase; generally it may be continued whilst preserving suitable activity in the catalyst, until 10 to 500 g are obtained, and preferably from 30 to 250 g, of polyethylene or copolymer of ethylene per milligramme atom of vanadium.

The polymers or copolymers of ethylene obtained in the presence of catalysts prepared according to the present invention have the advantage of a broad molecular weight distribution. The latter may be characterised by the ratio between the mean molecular weight bymass, Mw, and the mean molecular weight by number, Mn, of the polymers or copolymers, measured by gel permeation chromatography (GPC), it being possible for this ratio to be greater than 8 and generally greater than 10. This molecular weight distribution may also be characterised by the flow parameter, n, which is greater than 1.8 and generally greater than 1.9, this flow parameter being calculated according to one of the following two equations:

$$n(21.6/5) = \log (MI_{21.6}/MI_5)/\log (21.6/5)$$

$$n(21.6/8.5) = \log (MI_{21.6}/MI_{8.5})/\log (21.6/8.5)$$

in which $MI_{21.6}$, $MI_{8.5}$ and $MI_5$ are the melt indices of the polymers measured at 190° C. under a load of 21.6 kg (ASTM D 1238-57 T standard, condition F), 8.5 kg and 5 kg (ASTM 1238-57 T standard, condition P) respectively.

Method of determining the mean diameters by mass (Dm) and by number (Dn) of the support particles of magnesium chloride of the catalyst, prepolymer or polymer According to the invention the mean diameters by mass (Dm) and by number (Dn) of the support particles of magnesium chloride, of catalyst, prepolymer or polymer are measured from microscope observations by means of the OPTOMAX image analyser (Micro-Measurements Ltd., Great Britain). The measuring principle consists in obtaining from the experimental study by light-optical microscopy of a population of particles, a table of absolute frequencies giving the number ($n_i$) of particles belonging to each class (i) of diameters, each class (i) being characterised by an intermediate diameter ($d_i$), comprised between the limits of the said class. According to the authorised French Standard NF X 11-630 of June 1981, Dm and Dn are provided by the following formulae:

$$\text{mean diameter by mass:} \quad D_m = \frac{\Sigma n_i(d_i)^3 d_i}{\Sigma n_i(d_i)^3}$$

$$\text{mean diameter by number:} \quad D_n = \frac{\Sigma n_i \cdot d_i}{\Sigma n_i}$$

The ratio Dm:Dn characterised the particle size distribution; it is sometimes known as the "width of particle size distribution".

The measurement by the OPTOMAX image analyser is performed by means of an inverted microscope which makes it possible to examine the suspensions of particles of magnesium chloride, of catalyst, of prepolymer or polymer at an enlargement comprised between 16 and 200 X. A television camera picks up the images given by the inverted microscope and transmits them to a computer which analyses the images line by line and dot by dot on each line, in order to determine the dimensions or diameters of the particles and then to classify them.
Method of determining the concentration of Mg—C bonds in the magnesium chloride support material.

A sample of the support material is treated with aqueous standard nitric acid solution so as to hydrolyse the Mg—C bonds. The excess nitric acid is then back-titrated. The quantity of nitric acid consumed, in moles, corresponds to the number of moles of Mg—C bonds in the sample.

The following non-restrictive Examples illustrate the invention.

EXAMPLE 1

Preparation of the support

Into a 5-liter stainless steel reactor provided with a stirrer system rotating at 750 revolutions per minute and containing 495 ml of n-hexane, there are introduced at ambient temperature (20° C.) and under a blanket of nitrogen: 2000 ml of a solution of butyloctylmagnesium in n-hexane containing 1740 milligramme atoms of magnesium and 10.6 ml (or 52 millimoles) of di-isoamylether. The reactor is then heated to 50° C. and there are poured in drop by drop during 3 hours a mixture comprising 385 ml (or 3465 millimoles) of t.-butyl chloride and 106 ml (or 521 millimoles) of di-isoamylether. At the end of this addition the suspension is maintained at 50° C. for 3 hours, and the precipitate obtained is then washed 6 times with n-hexane. The solid product obtained (support A) contains per gramme atom of magnesium;

1.96 gramme atoms of chlorine
0.03 moles of Mg—C bonds
0.02 mole of di-isoamylether On examination under the microscope it is seen to have the form of a powder consisting of spheroidal particles (the mean ratio between the large and small axis D:d of the particles is equal to 1.3) having a mean diameter by mass Dm equal to 23 microns and a particle size distribution such that Dm:Dn=1.2; less than 0.05 percent by weight of particles with a diameter less than 5 microns is found; the density of the product is equal to 2.1 and its specific surface area is 46 m²/g (BET).

Preparation of the catalyst

Into a 1-liter glass reactor provided with a stirrer system rotating at 300 revolutions per minute there are introduced at ambient temperature (20° C.) 125 ml of a suspension in n-hexane of the support A prepared previously, this suspension containing 100 milligramme atoms of magnesium, and 200 ml of a molar solution of vanadium tetrachloride in n-hexane. The reactor is then heated to 50° C. and the mixture is maintained at this temperature with agitation for 2 hours. The solid product obtained is then washed several times in hot n-hexane (50° C.) until the chlorine content in the n-hexane is less than 2 milligramme atoms per liter. The washed solid product obtained (catalyst B) contains per gramme atom of total vanadium ($V_t$):

1 gramme atom of trivalent vanadium ($V^{3+}$),
1.54 gramme atoms of magnesium (Mg),
5.9 gramme atoms of chlorine (Cl),
0.01 mole of di-isoamylether (DIAE), (which corresponds, as shown in Table 1, to ratios of $V^{3+}:V_t=1$, $V_t:Mg=0.65$, $Cl:V_t=5.9$ and $DIAE:V_t=0.01$). Catalyst B occurs in the form of particles of a violet colour which are more or less identical in shape and size to those of support A and in particular have a mean diameter by mass Dm equal to 24 microns and a particle size distribution such than Dm:Dn=1.3.

Polymerisation of ethylene

Into a 5-liter stainless steel reactor provided with a stirrer system rotating at 550 revolutions per minute, there are introduced at ambient temperature (20° C.) and under nitrogen, 2 liters of n-hexane which is heated to 80° C., then 4 millimoles of tri-n-octylaluminium (TnOA) and a quantity of catalyst B prepared previously containing 0.5 milligramme atom of vanadium. The reactor is then closed and there are introduced a quantity of hydrogen corresponding to a partial pressure of 0.1 MPa and ethylene at a rate of 160 g/hr for 3 hours. The mean activity of catalyst B during the reaction is equal to 2000 grammes of polyethylene per gramme of catalyst per hour and per MPa of partial pressure of ethylene. At the end of this time and after cooling and evaporation of the n-hexane, approximately 480 g are collected of a polyethylene powder having the following characteristics:

powder consisting of spheroidal particles having a mean diameter by mass Dm=340 microns;
content by weight of fine particles with a diameter less than 80 microns: 0%;
bulk density (BD): 0.37 g/cm³;
melt index ($MI_5$), measured at 190° C., under a load of 5 kg: 0.53 g/10 minutes;
flow parameter:
n(21.6/5)=1.98
n(21.6/8.5)=2.12

EXAMPLE 2

Preparation of the catalyst

One operates as in Example 1, except for the fact that instead of heating the reactor to 50° C., it is maintained at 20° C. A solid product (catalyst C) is obtained, the chemical composition and physical characteristics of which are shown in Table 1.

Polymerisation of ethylene

One operates as in Example 1, except for the fact that instead of using catalyst B, catalyst C prepared previously is employed. The activity of this catalyst in polymerisation and the characteristics of the polymer obtained are given in Table 6.

EXAMPLE 3

Preparation of the catalyst

One operates as in Example 1, except for the fact that instead of heating the reactor to 50° C., it is maintained at 20° C. and instead of introducing into the reactor 200 ml of a molar solution of vanadium tetrachloride in n-hexane, 50 ml of this solution are introduced. A solid product is obtained (catalyst D), the chemical composition and physical characteristics of which are shown in Table 1.

Polymerisation of ethylene

One operates as in Example 1, except for the fact that instead of using catalyst B, catalyst D prepared previously is employed. The activity of this catalyst in polymerisation and the characteristics of the polymer obtained are given in Table 6.

EXAMPLE 4

Preparation of the catalyst

One operates as in Example 1, except for the fact that instead of heating the reactor to 50° C., it is maintained at 20° C., and instead of introducing into the reactor 200 ml of a molar solution of vanadium tetrachloride in n-hexane, 10 ml of this solution are introduced. A solid product is obtained (catalyst E), the chemical composition and physical characteristics of which are shown in Table 1.

Polymerisation of ethylene

One operates as in Example 1, except for the fact that instead of using catalyst B, catalyst E prepared previously is employed. The activity of this catalyst in polymerisation and the characteristics of the polymer obtained are given in Table 6.

EXAMPLE 5

Preparation of the catalyst

One operates as in Example 1, except for the fact that instead of heating the reactor to 50° C., it is heated to 20° C. and instead of introducing into the reactor 200 ml of a molar solution of vanadium tetrachloride in n-hexane, 8 ml of this solution are introduced. A solid product is obtained (catalyst F), the chemical composition and physical characteristics of which are shown in Table 1.

Polymerisation of ethylene

One operates as in Example 1, except for the fact that instead of using catalyst B, catalyst F prepared previously is employed. The activity of this catalyst in polymerisation and the characteristics of the polymer obtained are given in Table 6.

EXAMPLE 6

Preparation of the catalyst

One operates as in Example 1, except for the fact that instead of heating the reactor to 50° C., it is cooled to 0° C. and instead of introducing into the reactor 200 ml of a molar solution of vanadium tetrachloride in n-hexane, 50 ml of this solution are introduced. A solid product is obtained (catalyst G), the chemical composition and physical characteristics of which are shown in Table 1.

Polymerisation of ethylene

One operates as in Example 1, except for the fact that instead of using catalyst B, catalyst G prepared previously is employed. The activity of this catalyst in polymerisation and the characteristics of the polymer obtained are given in Table 6.

EXAMPLE 7

Preparation of the catalyst

One operates as in Example 1, except for the fact that instead of heating the reactor to 50° C., it is cooled to 0° C. and instead of introducing into the reactor 200 ml of a molar solution of vanadium tetrachloride in n-hexane, 50 ml of this solution and 5 ml (or 25 millimoles) of di-isoamylether are introduced. A solid product is obtained (catalyst H), the chemical composition and physical characteristics of which are shown in Table 1.

Polymerisation of ethylene

One operates as in Example 1, except for the fact that instead of using catalyst B, catalyst H prepared previously is employed. The activity of this catalyst in polymerisation and the characteristics of the polymer obtained are given in Table 6.

EXAMPLE 8

Preparation of the support

Into a 5-liter stainless steel reactor provided with a stirrer system rotating at 1000 revolutions per minute and containing 800 ml of n-hexane, there are introduced at ambient temperature (20° C.) and under a blanket of nitrogen: 1725 ml of a solution of butyloctylmagnesium in n-hexane containing 1500 milligramme atoms of magnesium and 9.1 ml (or 45 millimoles) of di-isoamylether. The reactor is then heated to 55° C. and there are poured in drop by drop over 8 hours a mixture comprising 313 ml (or 2850 millimoles) of t.-butyl chloride and 91.5 ml (or 450 millimoles) of di-isoamylether. At the end of this addition, the suspension is maintained at 55° C. for 3 hours, and the precipitate obtained is washed 6 times with n-hexane. The solid product obtained (support I) contains per gramme atom of magnesium:

1.92 gramme atoms of chlorine
0.05 moles of Mg—C
0.01 mole of di-isoamylether

On examination under the microscope it is seen to have the form of a powder consisting of spheroidal particles having a mean diameter by mass, Dm, equal to 20 microns and a particle size distribution such that Dm:Dn=1.4.

Preparation of the catalyst

Into a 1-liter glass reactor provided with a stirrer system rotating at 300 revolutions per minute, there are introduced at ambient temperature (20° C.) 125 ml of suspension in n-hexane of the support I prepared previously, this suspension containing 100 milligramme atoms of magnesium and 50 ml of a molar solution of vanadium tetrachloride in n-hexane. The reactor is then maintained at 20° C. and the mixture is stirred for 2 hours at this temperature. The solid product obtained is then washed several times in hot n-hexane (50° C.) until the content of chlorine in the hydrocarbon medium is less than 2 milligramme atoms per liter. The solid product obtained (catalyst J) has a chemical composition and the physical characteristics shown in Table 1.

Polymerisation of ethylene

One operates as in Example 1, except for the fact that instead of using catalyst B, catalyst J prepared previously is employed. The activity of this catalyst in polymerisation and the characteristics of the polymer obtained are given in Table 6.

EXAMPLE 9

Preparation of the support

Into a 5-liter stainless steel reactor provided with a stirrer system rotating at 750 revolutions per minute and containing 800 ml of n-hexane, there are introduced at ambient temperature (20° C.) and under a blanket of nitrogen: 1725 ml of a solution of butyloctylmagnesium in n-hexane containing 1500 milligramme atoms of magnesium and 9.1 ml (or 45 millimoles) of di-isoamylether. The reactor is then heated to 50° C. and there are introduced gradually over 3 hours a mixture comprising 313 ml (or 2850 millimoles) of t.-butyl chloride and 91.5 ml (or 450 millimoles) of di-isoamylether. At the end of this addition, the suspension is maintained at 50° C. for 3 hours, and then the precipitate obtained in washed six times with n-hexane. The solid product obtained (support K) contains per gramme atom of mgnesium:

1.96 gramme atoms of chlorine
0.03 moles of Mg—C
0.03 mole of di-isoamylether

On examination under the microscope it is seen to have the form of a powder consisting of spheroidal particles having a mean diameter by mass, Dm, equal to 27 microns and a particle size distribution such that the Dm:Dn=1.3.

Preparation of the catalyst

One operates as in Example 8, except for the fact that instead of using support I, suppork K prepared previously is employed and instead of introducing into the reactor 50 ml of a molar solution of vanadium tetrachloride in n-hexane, 8 ml of this solution are introduced. A solid product is obtained (catalyst L), the chemical composition and physical characteristics of which are shown in Table 1.

Polymerisation of ethylene

One operates as in Example 1, except for the fact that instead of using catalyst B, catalyst L prepared previously is employed. The activity of this catalyst in polymerisation and the characteristics of the polymer obtained are given in Table 6.

EXAMPLE 10

Preparation of support

Into a 5-liter stainless steel reactor provided with a stirrer system rotating at 400 revolutions per minute and containing 1 liter of n-hexane, there are introduced at ambient temperature (20° C.) and under a blanket of nitrogen 9.5 ml (47 millimoles) of di-isoamylether. The reactor is heated to 55° C. and there are introduced gradually over 1 hour and simultaneously, on the one hand 667 ml of a 0.81 molar solution of butyloctylmagnesium in n-hexane, and on the other hand 148 ml of a mixture prepared beforehand of 348 ml of t.-butyl chloride and 95 ml of di-isoamylether. After the first half-hour of introduction of these reactants, the speed of stirring is increased from 400 to 800 revolutions per minute and maintained at this figure. At the end of an hour of introduction of the reactants, there is introduced into the reaction medium as a singe quantity and rapidly 1334 ml of the 0.81 molar solution of butyloctyl-magnesium in n-hexane, and gradually over 2 hours the remaining 295 ml of the mixture prepared beforehand of t.-butyl chloride and di-isoamylether. At the end of this time, the speed of stirring is reduced to 400 revolutions per minute and the mixture is maintained with this stirring speed for 3 hours at 55° C. The product obtained is washed several times with n-hexane. The solid product obtained (support M) contains per gramme atom of magnesium:

1.90 gramme atoms of chlorine
0.01 moles of Mg—C
0.03 mole of di-isoamylether

On examination under the microscope it is seen to have the form of a powder consisting of spheroidal particles having a mean diameter by mass, Dm, equal to 18 microns, and a particle size distribution such that the Dm:Dn=2.5.

Preparation of the catalyst

One operates as in Example 8, except for the fact that instead of using support I, suppork M prepared previously is employed, and instead of introducing into the reactor 50 ml of a molar solution of vanadium tetrachloride in n-hexane, 8 ml of this solution are introduced. A solid product is obtained (catalyst N), the chemical composition and physical characteristics of which are shown in Table 1.

Polymerisation of ethylene

One operates as in Example 1, except for the fact that instead of using catalyst B, catalyst N prepared previously is employed. The activity of this catalyst in polymerisation and the characteristics of the polymer obtained are given in Table 6.

COMPARATIVE EXAMPLE 11

Preparation of the catalyst

One operates as in Example 1, except for the fact that instead of introducing into the reactor 200 ml of a molar solution of vanadium tetrachloride in n-hexane, there are introduced 200 ml of a molar solution of titanium tetrachloride in n-hexane. A solid product is obtained (catalyst P) the chemical composition and physical characteristics of which are shown in Table 2.

It is found that very little titanium compound remains fixed in the support and that it occurs solely in a non-reduced form $(Ti^{3+}:Ti_t=0)$.

Polymerisation of the ethylene

One operates as in Example 1, except for the fact that instead of using catalyst B, catalyst P is employed and the partial pressure of hydrogen is 0.05 MPa instead of 0.1 MPa. The activity of this catalyst and the characteristics of the polymer obtained are given in Table 7. It is found that the activity of the catalyst is relatively low and that the polymer obtained has a high content of fine particles, and a relatively low bulk density and a low flow parameter.

COMPARATIVE EXAMPLE 12

Preparation of catalyst

One operates as in Example 1, except for the fact that instead of introducing into the reactor 200 ml of a molar solution of vanadium tetrachloride in n-hexane, there are introduced 200 ml of a molar solution of titanium tetrachloride in n-hexane and 5 ml (or 25 millimoles) of di-isoamylether. A solid product is obtained (catalyst Q) the chemical composition and physical characteristics of which are shown in Table 2.

It is found that the presence of an electron donor compound such as di-disoamylether does not facilitate the deposit of titanium compound on the support and that the titanium still remains at its maximum valency.

Polymerisation of ethylene

One operates as in Example 1, except that instead of using catalyst B, catalysts Q is employed and the partial pressure of hydrogen is 0.05 MPa instead of 0.1 MPa. The activity of this catalyst and the characteristics of the polymer obtained are given in Table 7.

It is found that the activity of the catalyst is low and the polymer obtained has a high content of fine particles.

COMPARATIVE EXAMPLE 13

Preparation of the catalyst

One operates as in Example 1, except for the fact that instead of introducing into the reactor 200 ml of a molar solution of vanadium tetrachloride in n-hexane, there are introduced 200 ml of a 5 molar solution of titanium tetrachloride in n-hexane. A solid product is obtained (catalyst R) the chemical composition and physical characteristics of which are shown in Table 2.

It is found that despite the presence of a considerable excess of the quantity of titanium tetrachloride employed as compared with that of the support, the quantity of titanium compound deposited on the support still remains at a very low value.

Polymerisation of ethylene

One operates as in Example 1, except that instead of using catalyst B, catalyst R prepared previous employed, and the partial pressure of hydrogen is 0.05 MPa instead of 0.1 MPa. The activity of this catalyst and the characteristics of the polymer obtained are given in Table 7. It is found that the activity of the catalyst is comparatively low and that the polymer obtained has a high content of fine particles, and a relatively low bulk density and low flow parameters.

EXAMPLE 14

Preparation of the catalyst

One operates as in Example 1, except for the fact that instead of heating the reactor to 50° C., it is heated to 80° C., and instead of introducing into the reactor 200 ml of a molar solution of vanadium tetrachloride in n-hexane, there are introduced 200 ml of a molar solution of vanadium oxytrichloride in n-hexane. A solid product is obtained (catalyst S), which contains per gramme atom of total vanadium ($V_t$):

1 gramme atom of tetravalent vanadium ($V^{4+}$),
14.3 gramme of atoms of magnesium (Mg)
32.2 gramme atoms of chlorine (Cl)
0 mole of di-isoamylether (DIAE)
(which corresponds as shown in Table 3 to ratios $V^{4+}:V_t=1$, $V_t:Mg=0.07$, $Cl:V_t=32.2$, $DIAE:V_t=0$).

The physical characteristics of the catalyst S are also shown in Table 3.

Polymerisation of ethylene

One operates as in Example 1, except for the fact that instead of using catalyst B, catalyst S prepared previously is employed. The activity of this catalyst in polymerisation and the characteristics of the polymer obtained are give in Table 7.

EXAMPLE 15

Preparation of the catalyst

One operates as in Example 1, except for the fact that instead of introducing into the reactor 200 ml of a molar solution of vanadium tetrachloride in n-hexane, there is introduced a mixture comprising on the one hand 200 ml of a molar solution of vanadium oxytrichloride in n-hexane, and on the other hand 6.1 ml (or 30 millimoles) of di-isoamylether. A solid product is obtained (catalyst T), the chemical composition and physical characteristics of which are given in Table 3.

Polymerisation of ethylene

One operates as in Example 1, except for the fact that instead of using catalyst B, catalyst T prepared previously is employed. The activity of this catalyst in polymerisation and the characteristics of the polymer obtained are given in Table 7.

EXAMPLE 16

Preparation of the support

One operates as in Example 12, except for the fact that instead of heating the reactor to 50° C., it is heated to 55° C., and instead of introducing gradually into the reactor a mixture comprising 313 ml of t.-butyl chloride and 91.5 ml of di-isoamylether, there is introduced solely 313 ml of t.-butyl chloride. A solid product is obtained (support U), which contains per gramme atom of magnesium:

1.98 gramme atoms of chlorine
0.02 mols of Mg—C
0.01 mole di-isoamylether.

On examination under the microscope it is seen to have the form of a powder consisting of spheroidal particles having a mean diameter by mass, Dm, equal to 36 microns and a particle size distribution such that Dm:Dn=1.2.

Preparation of the catalyst

Into a 1-liter glass reactor provided with a stirrer system rotating at 300 revolutions per minute there are introduced at ambient temperature (20° C.) 125 ml of suspension in n-hexane of the support U prepared previously, this suspension containing 100 milligramme atoms of magnesium, and 200 ml of a molar solution of vanadium oxytrichloride in n-hexane. The reactor is then heated to 60° C. and the mixture is maintained at this temperature for 2 hours with stirring. The solid product obtained is then washed several times in hot n-hexane (50° C.) until the chlorine content in the n-hexane is less than 2 milligramme atoms per liter. A solid product is obtained (catalyst V), the chemical composition and physical characteristics of which are shown in Table 3.

Polymerisation of ethylene

One operates as in Example 1, except for the fact that instead of using catalyst B, catalyst V prepared previously is employed. The activity of this catalyst in polymerisation and the characteristics of the polymer obtained are given in Table 7.

COMPARATIVE EXAMPLE 17

Preparation of the catalyst

Into a 1-liter glass reactor provided with a stirrer system rotating at 300 revolutions per minute, there are introduced at ambient temperature (20° C.) 125 ml of suspension in n-hexane of the support A prepared in Example 1, the suspension containing 100 milligramme atoms of magnesium, and 10 ml of a molar solution of vanadium oxytrichloride in n-hexane and 4 ml (or 20 millimoles) of di-isoamylether. The reactor is then heated to 50° C. and the mixture is maintained at this temperature for 1 hour with stirring. At the end of this time there are introduced into the reactor gradually over 1 hour 40 ml of a 0.125 molar solution of diethylaluminium chloride (DEAC) in n-hexane. At the end of this addition the mixture is maintained with stirring for 2 hours at 50° C. The solid product obtained is then washed several times in hot n-hexane (50° C.) until the chlorine content in the n-hexane is less than 2 milligramme atoms per liter. A solid product is obtained (catalyst W), the chemical composition and physical characteristics of which are shown in Table 4.

Polymerisation of ethylene

One operates as in Example 1, except for the fact that instead of using catalyst B, catalyst W prepared previously is employed. The activity of this catalyst in polymerisation and the characteristics of the polymer obtained are given in Table 7.

COMPARATIVE EXAMPLE 18

Preparation of the catalyst

Into a 1-liter glass reactor provided with a stirrer system rotating at 300 revolutions per minute, there are introduced at ambient temperature (20° C.) 125 ml of suspension in n-hexane of the support K prepared in Example 9, the suspension containing 100 milligramme atoms of magnesium, and 15 ml of a molar solution of vanadium tetrachloride in n-hexane. This mixture is maintained with stirring at 20° C. for 1 hour. At the end of this time there are introduced into the reactor gradually over 1 hour 60 ml of a 0.125 molar solution of diethylaluminium chloride (DEAC) in n-hexane. At the end of this addition, the mixture is maintained with stirring for 2 hours at 50° C. The solid product obtained is then washed several times in hot n-hexane (50° C.) until the chlorine content in the n-hexane is less than 2 milligramme atoms per liter. A solid product is obtained (catalyst X), the chemical composition and physical characteristics of which are shown in Table 5.

Polymerisation of ethylene

One operates as in Example 1, except for the fact that instead of using catalyst B, catalyst X prepared previously is employed. The activity of this catalyst in polymerisation and the characteristics of the polymer obtained are given in Table 7.

EXAMPLE 19

Preparation of the catalyst

Into a 1-liter glass reactor provided with a stirrer system rotating at 300 revolutions per minute, there are introduced at ambient temperature (20° C.) 125 ml of suspension in n-hexane of the support A prepared in Example 1, this suspension containing 100 milligramme atoms of magnesium, and 10 ml of a molar solution of vanadium tetrachloride in n-hexane. The mixture is maintained with stirring at 20° C. for 2 hours. The solid product obtained is then washed several times in hot n-hexane (50° C.) until the chlorine content in the n-hexane is less than 2 milligramme atoms per liter. A washed solid product is obtained (catalyst Y), contains per gramme atom of total vanadium ($V_t$):

1 gramme atom of trivalent vanadium ($V^{3+}$),
14 gramme atoms of magnesium (Mg)
30.5 gramme atoms of chlorine (Cl)
0.26 mole of di-isoamylether (DIAE)

(which corresponds to the following ratios: $V^{3+}:V_t=1$, $V_t:Mg=0.07$, $Cl:V_t=30.5$ and $DIAE:V_t=0.26$).

The catalyst Y has the form of a powder consisting of particles with a means diameter by mass, Dm, equal to 28 microns and a particle size distribution such that Dm:Dn=1.4.

Preparation of the prepolymer

Into a 5-liter stainless steel reactor provided with a stirrer system rotating at 550 revolutions per minute, there are introduced 3000 ml of n-hexane which is heated to 70° C., 52 ml of a molar solution of tri-n-octylaluminium in n-hexane, a quantity of catalyst Y corresponding to 3.6 milligramme atoms of vanadium and a volume of 1500 ml of hydrogen, measured under normal conditions. Ethylene is then introduced at a rate of 180 g/hr for 3 hours, and also a volume of 1500 ml of hydrogen measured under normal conditions after 1½ hours of reaction. The prepolymer Z obtained is dried at 70° C. under nitrogen, the quantity collected being about 530 g. The prepolymer powder has a narrow particle size distribution and a mean diameter by mass, Dm, equal to 125 microns.

Copolymerisation of ethylene

Into a 2.6 liter stainless steel reactor provided with a spiral stirrer rotation at 250 revolutions per minute, and heated to 80° C., there are introduced under an atmosphere of nitrogen, as a charge powder, 150 g of a perfectly anhydrous and inert polyethylene powder and 18 g of the prepolymer Z prepared previously.

The mixture thus obtained is stirred for about 5 minutes under an atmosphere of nitrogen in order to guarantee good dispersion of the prepolymer in the charge powder. The reactor is then de-gassed and there are introduced a mixture of hydrogen, ethylene and normal 1-butene so that the total pressure is equal to 1.0 MPa and the partial pressures (pp) of the various constituents of the reaction gas mixture are as follows:

pp hydrogen=0.16 MPa
pp ethylene=0.79 MPa
pp normal 1-butene=0.05 MPa.

The copolymerisation reaction is stopped when 480 g of copolymer have been produced. The copolymer powder produced during this reaction is separated from the charge powder and has the following characteristics:

powder consisting of spheroidal particles having a mean diameter by mass, Dm=370 microns;
content by weight of fine particles of a diameter less than 80 microns: 0.2%;
bulk density: 0.44 g/cm$^3$;
density of copolymer: 0.955:
content by weight of units derived from normal 1-butene: 0.4%; vanadium content: 13 ppm;
melt index (MI$_5$): 0.26 g/10 minutes;
flow parameter: n (21.6/8.5)=2.0

TABLE 1

| | | | Preparation of the catalysts | | | | | | | |
|---|---|---|---|---|---|---|---|---|---|---|
| | | | Relative molar quantities of the compounds brought | | Composition and characteristics of the catalysts | | | | | |
| Example | Support | Precipitation temperature | into contact with each other VCl$_4$/MgCl$_2$/DIAE | Catalyst | $V^{3+}:V_t$ | $V_t:Mg$ | $Cl:V_t$ | $DIAE:V_t$ | Dm (microns) | Dm:Dn |
| 1 | A | 50° C. | 2/1/0 | B | 1 | 0.65 | 5.9 | 0.01 | 24 | 1.3 |
| 2 | A | 20° C. | 2/1/0 | C | 1 | 0.31 | 8.8 | 0.02 | 24 | 1.3 |
| 3 | A | 20° C. | 0.5/1/0 | D | 1 | 0.14 | 17.9 | 0.08 | 23 | 1.3 |
| 4 | A | 20° C. | 0.1/1/0 | E | 1 | 0.08 | 27.2 | 0.12 | 23 | 1.2 |
| 5 | A | 20° C. | 0.08/1/0 | F | 1 | 0.05 | 40.3 | 0.12 | 23 | 1.2 |
| 6 | A | 0° C. | 0.5/1/0 | G | 1 | 0.06 | 35.6 | 0.26 | 23 | 1.3 |
| 7 | A | 0° C. | 0.5/1/0.25 | H | 1 | 0.05 | 42.8 | 0.67 | 23 | 1.2 |
| 8 | I | 20° C. | 0.5/1/0 | J | 1 | 0.29 | 10.0 | 0.03 | 21 | 1.5 |
| 9 | K | 20° C. | 0.08/1/0 | L | 1 | 0.05 | 47 | 0.38 | 27 | 1.4 |
| 10 | M | 20° C. | 0.08/1/0 | N | 1 | 0.06 | 34.5 | 0.31 | 18 | 2.5 |

TABLE 2

| | | | Preparation of the catalysts | | | | | | | |
|---|---|---|---|---|---|---|---|---|---|---|
| | | | Relative molar quantities of the compounds brought | | Composition and characteristics of the catalysts | | | | | |
| Comparative Example | Support | Precipitation temperature | into contact with each other TiCl$_4$/MgCl$_2$/DIAE | Catalyst | $Ti^{3+}:Ti_t$ | $Ti_t:Mg$ | $Cl:Ti_t$ | $DIAE:Ti_t$ | Dm (microns) | Dm:Dn |
| 11 | A | 50° C. | 2/1/0 | P | 0 | 0.019 | 102 | 0.13 | 23 | 1.2 |
| 12 | A | 50° C. | 2/1/0.25 | Q | 0 | 0.019 | 101 | 0.15 | 23 | 1.2 |

TABLE 2-continued

Preparation of the catalysts

| Comparative Example | Support | Precipitation temperature | Relative molar quantities of the compounds brought into contact with each other TiCl$_4$/MgCl$_2$/DIAE | Catalyst | Ti$^{3+}$: Ti$_t$ | Ti$_t$: Mg | Cl: Ti$_t$ | DIAE: Ti$_t$ | Dm (microns) | Dm: Dn |
|---|---|---|---|---|---|---|---|---|---|---|
| 13 | A | 50° C. | 10/1/0 | R | 0 | 0.020 | 104 | 0.12 | 23 | 1.3 |

TABLE 3

Preparation of the catalysts

| Example | Support | Precipitation temperature | Relative molar quantities of the compounds brought into contact with each other VOCl$_4$/MgCl$_2$/DIAE | Catalyst | V$^{4+}$: V$_t$ | V$_t$: Mg | Cl: V$_t$ | DIAE: V$_t$ | Dm (microns) | Dm: Dn |
|---|---|---|---|---|---|---|---|---|---|---|
| 14 | A | 80° C. | 2/1/0 | S | 1 | 0.07 | 32.2 | 0 | 23 | 1.3 |
| 15 | A | 50° C. | 2/1/0.3 | T | 1 | 0.05 | 39.3 | 0.8 | 23 | 1.3 |
| 16 | U | 60° C. | 2/1/0 | V | 1 | 0.09 | 25.2 | 0.003 | 36 | 1.3 |

TABLE 4

Preparation of the catalysts

| Comparative Example | Support | Precipitation temperature | Relative molar quantities of the compounds brought into contact with each other VOCl$_3$/MgCl$_2$/DEAC/DIAE | Catalyst | V$^{4+}$: V$_t$ | V$_t$: Mg | Cl: V$_t$ | DIAE: V$_t$ | Dm (microns) | Dm: Dn |
|---|---|---|---|---|---|---|---|---|---|---|
| 17 | A | 50° C. | 0.1/1/0.05/0.2 | Q | 1 | 0.08 | 27.1 | 0.38 | 21 | 4.3 |

TABLE 5

Preparation of the catalysts

| Comparative Example | Support | Precipitation temperature | Relative molar quantities of the compounds brought into contact with each other VCl$_4$/MgCl$_2$/DEAC | Catalyst | V$^{3+}$: V$_t$ | V$_t$: Mg | Cl: V$_t$ | DIAE: V$_t$ | Dm (microns) | Dm: Dn |
|---|---|---|---|---|---|---|---|---|---|---|
| 18 | K | 20° C. | 0.15/1/0.075 | X | 1 | 0.09 | 24.2 | 0.13 | 25 | 5.8 |

TABLE 6

Polymerisation

| Example | Catalyst | Activity (1) | Dm (microns) | % by weight of particles below 80μ | BD g/cm$^3$ | MI$_5$ g/10 min. | n(21.6/5) | n(21.6/8.5) | Mw/Mn |
|---|---|---|---|---|---|---|---|---|---|
| 1 | B | 2000 | 320 | 0 | 0.37 | 0.53 | 1.98 | 2.12 | — |
| 2 | C | 2500 | 310 | 0.6 | 0.35 | 0.37 | 2.11 | 2.38 | — |
| 3 | D | 1500 | 230 | 0.5 | 0.38 | 0.56 | 2.02 | 2.19 | — |
| 4 | E | 1400 | 200 | 0.4 | 0.35 | 0.47 | 1.98 | 2.12 | 10.8 |
| 5 | F | 1150 | 185 | 0.4 | 0.39 | 1.12 | 1.98 | 2.12 | 11.6 |
| 6 | G | 1100 | 190 | 0.3 | 0.37 | 0.32 | 1.97 | 2.12 | 11.9 |
| 7 | H | 1000 | 200 | 0.4 | 0.40 | 1.33 | 1.92 | 2.03 | — |
| 8 | J | 1400 | 260 | 0.1 | 0.36 | — | — | — | — |
| 9 | L | 1200 | 200 | 0.2 | 0.42 | 1.1 | 1.98 | 2.12 | — |
| 10 | N | 2500 | 150 | 0.5 | 0.44 | 0.99 | 1.98 | 2.13 | — |

(1) Activity expressed in grammes of polyethylene per gramme of catalyst, per hour and per MPa of partial pressure of ethylene.

TABLE 7

Polymerisation

| Example | Catalyst | Activity (1) | Dm (microns) | % by weight of particles below 80μ | BD g/cm$^3$ | MI$_5$ g/10 min. | n(21.6/5) | n(21.6/8.5) | Mw/Mn |
|---|---|---|---|---|---|---|---|---|---|
| 11 (comparative) | P | 900 | 130 | 4.0 | 0.34 | 5.0 | 1.71 | 1.78 | — |
| 12 (comparative) | Q | 800 | 160 | 1.7 | 0.35 | 3.3 | 1.68 | 1.76 | 8.0 |

TABLE 7-continued

| Example | Catalyst | Activity (1) | Dm (microns) | Polymerisation % by weight of particles below 80μ | BD g/cm$^3$ | MI$_5$ g/10 min. | n(21.6/5) | n(21.6/8.5) | Mw/Mn |
|---|---|---|---|---|---|---|---|---|---|
| 13 (comparative) | R | 1000 | 130 | 2.8 | 0.29 | 4.1 | 1.82 | 1.92 | — |
| 14 | S | 760 | 210 | 0.4 | 0.41 | 0.3 | 2.1 | 2.25 | 13.0 |
| 15 | T | 830 | 180 | 0.5 | 0.41 | 0.8 | 2.03 | 2.20 | 10.5 |
| 16 | V | 1150 | 190 | 0.5 | 0.42 | 0.16 | 2.18 | 2.26 | — |
| 17 (comparative) | W | 1100 | 200 | 2.2 | 0.42 | 0.86 | 2.01 | 2.17 | 8.0 |
| 18 (comparative) | X | 1600 | — | 4.1 | 0.34 | 1.64 | 2.0 | 2.12 | 7.7 |

(1) Activity expressed in grammes of polyethylene per gramme of catalyst, per hour and per MPa of partial pressure of ethylene.
*It will be noted that the Comparative Examples have all produced polyolefin having a percentage by weight of fine particles (below 80 microns) of at least 1.7.

We claim:

1. Process for the preparation of catalysts which may be used for the polymerisation and copolymerisation of ethylene, comprising a support basically of magnesium chloride and optionally aluminium chloride, on which is deposited by precipitation a vanadium compound, characterised in that a vanadium compound in which the vanadium is at one of its two maximum valencies 4 or 5 is brought into contact with a support basically of magnesium chloride and optionally aluminium chloride and comprising products with an Mg—C bond in a quantity such that the ratio of the number of Mg—C bonds to the total number of magnesium atoms contained in the support is comprised between 0.001 and 0.05, the quantities of the vanadium compound and the support brought into contact with each other being such that the molar ratio of the quantity of vanadium compound to that of the magnesium chloride of the support is greater than 0.05.

2. Process in accordance with claim 1, characterised in that the vanadium compound in which the vanadium is at one of its two maximum valencies 4 or 5 is brought into contact with the support in the presence of an electron donor compound chosen from among the organic compounds comprising at least 1 atom of oxygen, sulphur, nitrogen or phosphorus, in a quantity such that the molar ratio of the electron donor compound to the vanadium compound is comprised between 0.005 and 1.

3. Process in accordance with claim 2, characterised in that the electron donor compound is contained in part or totally in the support prior to the latter being brought into contact with the vanadium compound.

4. Process in accordance with claim 1, characterised in that the support has the form of spheroidal particles having a mean diameter by mass comprised between 10 and 100 microns and a particle size distribution such that the ratio of the mean diameter by mass, Dm, to the mean diameter by number, Dn, is less than or equal to 3.

5. Process in accordance with claim 4, characterised in that the particle size distribution of the support is such that the ratio Dm:Dn of the mean diameter by mass to the mean diameter by number of the particles is comprised between 1.1 and 2.5.

6. Process in accordance with claim 4, characterised in that the particle size distribution of the support is such that the ratio Dm:Dn is comprised between 1.1 and 1.5.

7. Process in accordance with claim 1, characterised in that the vanadium compound in which the vanadium is at one of its two maximum valencies 4 or 5 is a compound of the general formulae $$V(OR_7)_{4-m}X_m \text{ or } VO(OR_7)_{3-n}X_n$$

in which $R_7$ represents an alkyl group comprising 2 to 6 carbon atoms, X is a chlorine or bromine atom, m is an integer or a fraction comprised between 1 and 4, and n is a whole number or a fraction comprised between 1 and 3.

8. Process in accordance with claim 1, characterised in that the vanadium compound in which the vanadium is at one of its two maximum valencies 4 or 5 is vanadium tetrachloride or vanadium oxytrichloride.

9. Process in accordance with claim 1, characterised in that the vanadium compound in which the vanadium is at one of its two maximum valencies 4 or 5 is brought into contact with the support for a period of at least one hour, at a temperature comprised between −20° C. and 150° C.

10. Process in accordance with claim 1, characterised in that the vanadium compound in which the vanadium is at one of its two maximum valencies 4 or 5, is brought into contact with the support in a liquid hydrocarbon medium.

11. A novel catalyst obtainable by the process claimed in claim 1, characterised in that it comprises basically magnesium chloride and optionally aluminium chloride, together with a vanadium compound in a reduced form, the vanadium compound having a valency state below one of its two maximum valency states 4 or 5, the atomic ratio of vanadium to magnesium being at least 0.05.

12. A catalyst as claimed in claim 11, characterised in that it is in the form of spheroidal particles having a mean diameter by mass of from 10 to 100 microns and a particle size distribution such that the ratio of mean diameter by mass Dm to mean diameter by number Dn of the particle is not greater than 3.

13. Process in accordance with claim 1,
wherein the products with an Mg—C bond are in a quantity such that the ratio of the number of Mg—C bonds to the total number of magnesium atoms contained in the support is comprised between 0.005 and 0.03,
and wherein the quantities of the vanadium compound and the support brought into contact with each other being such that the molar ratio of the quantity of vanadium compound to that of the magnesium chloride of the support is comprised between 0.05 and 5.

14. A process in accordance with claim 2, wherein the molar ratio of the electron donor compound to the vanadium compound is comprised between 0.01 and 0.5.

15. Process in accordance with claim 9, wherein the temperature is comprised between 0° and 100° C.

16. The catalyst as claimed in claim 11, wherein the atomic ratio of vanadium to magnesium is at least 0.05 and is below 1.

17. The catalyst as claimed in claim 12, wherein the particle size distribution is such that the ratio of mean diameter by mass Dm to mean diameter by number Dn of the particle is from 1.1 to 2.5.

* * * * *

UNITED STATES PATENT AND TRADEMARK OFFICE
CERTIFICATE OF CORRECTION

PATENT NO. : 4,579,833

DATED : April 1, 1986

INVENTOR(S) : JOELLE COLLOMB and LASZLO HAVAS

It is certified that error appears in the above-identified patent and that said Letters Patent are hereby corrected as shown below:

Col. 5, line 39, "co-catalysts" should read --co-catalyst--

Col. 7, line 31, "magnesium;" should read --magnesium:--

Col. 13, line 58, "mols" should read --moles--

Signed and Sealed this

Twenty-second Day of July 1986

[SEAL]

*Attest:*

DONALD J. QUIGG

*Attesting Officer*  *Commissioner of Patents and Trademarks*